May 31, 1966  C. R. FERRIN  3,253,455

SAMPLE SYSTEM FOR GAS CHROMATOGRAPHY

Filed Oct. 18, 1962  3 Sheets-Sheet 1

INVENTOR.
CHARLES R. FERRIN
BY *Arthur L. Wade*
ATTORNEY

INVENTOR.
CHARLES R. FERRIN
BY Arthur L Wade
ATTORNEY

May 31, 1966        C. R. FERRIN        3,253,455

SAMPLE SYSTEM FOR GAS CHROMATOGRAPHY

Filed Oct. 18, 1962        3 Sheets-Sheet 3

INVENTOR.
CHARLES R. FERRIN

BY *Arthur L Wade*

ATTORNEY

United States Patent Office 3,253,455
Patented May 31, 1966

3,253,455
SAMPLE SYSTEM FOR GAS CHROMATOGRAPHY
Charles R. Ferrin, Tulsa, Okla., assignor to National Tank Company, Tulsa, Okla., a corporation of Nevada
Filed Oct. 18, 1962, Ser. No. 231,485
4 Claims. (Cl. 73—23.1)

The present invention relates to the inlet system of a gas chromatograph. More particularly, the invention relates to a valving system for control of the inlet system.

A partition chromatographic analysis is conducted by placing in an elongate column a finely divided solid material (commonly referred to as a substrate support) which has been impregnated with a suitable normally liquid or solid partitioning agent (commonly referred to as the substrate). A fluent carrier, in which a sample of fluent material to be analyzed is injected, is continuously passed through the column and the sample is resolved into its component parts as it floats through the chromatographic column, the individual components of the sample being detected in any suitable manner.

Certain types of columns make it necessary for the sample to be so small it cannot be accurately injected with a hypodermic syringe. A combination of restriction orifices may be employed to divert a small percentage of a large sample into the column. Whether a hypodermic syringe, or orifice system, is employed to control sample injection, material containing non-distillables (such as crude oil) could not be injected without complete disassembly and cleaning the inlet system and column after each analysis.

Solid samples offer more of a problem than fluid containing non-distillables. Such samples, with their distillables, cannot be inserted at all in systems set up to handle samples in a gaseous state.

Considering the syringe system, it has long been a problem to manipulate a syringe to form a series of volumetrically uniform samples. Considering the orifice system, there is the problem of keeping the split ratio consistent for all components of the sample passing through it as well as sizing the sample to give required accuracy.

An object of the present invention is to provide gaseous samples for a partition column of uniform volume and temperature.

Another object is to split off portions of a large gaseous sample, the portions being uniform in volume and temperature.

Another object is to prepare a sample of distillables from material containing non-distillables and keep the non-distillables isolated from the column.

The present invention is embodied in a system employing valves connected by conduits to a source of carrier vapor, a chromatographic partition column, and a source of samples to be analyzed. The valves and conduits are heated in a controlled manner.

The invention contemplates the injection of liquid samples directly into the closed loop of conduit-connected valves. The heat vaporizes the liquid to prepare the material for entry into the column.

The invention then contemplates manipulation of the valves to direct the carrier vapor through the closed loop, or a part of the loop, to push the sample into the column.

The invention further contemplates a loop of conduit extending from external the common heating zone and removably spliced into the closed loop. Provisions are made for inserting material containing non-distillables into the external loop and heating the external loop to drive distillables from the external loop and into the closed loop. The non-distillables remaining in the external loop can then be cleaned out of the external loop without contamination of the closed loop and column.

Other objects, advantages and features of this invention will become apparent to one skilled in the art upon consideration of the written specification, appended claims, and attached drawings, wherein;

The drawings of the embodiment of the invention are presented in diagrammatic form to disclose the invention as simply as possible. Neither the source for the carrier gas nor the source for a gaseous sample is shown. Also, it does not appear necessary to disclose the chromatographic column itself; it is only the connection of these units to the conduit-connected valve system which is necessary to disclose the present invention.

CLOSED CIRCUIT
General

Figure 1:
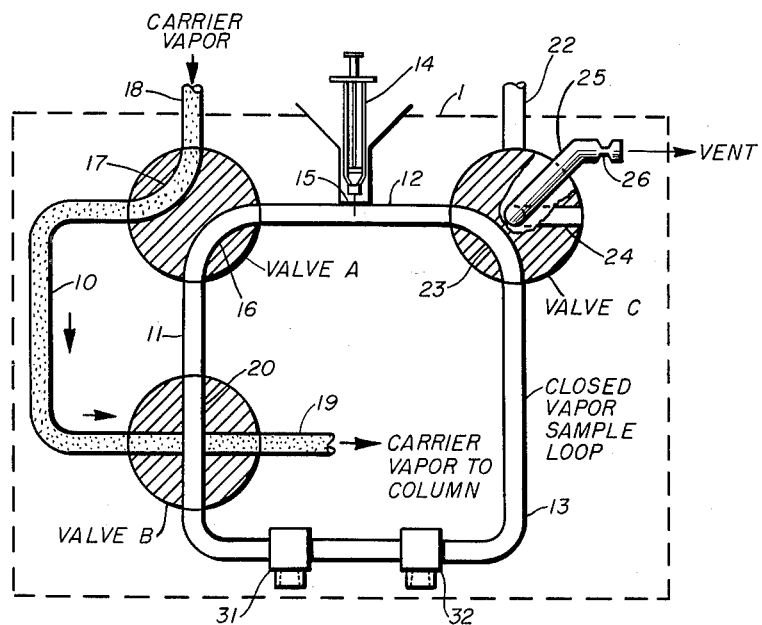
FIG. 1 is a diagrammatic representation of the conduit-connected valve structure in which the invention is embodied.

FIG. 1 illustrates three valves which are individually positioned from one to another of two positions. In taking up each position, each valve is turned 90 degrees clockwise to bring passages within the valve into alignment with certain conduits to attain the objectives of the invention. All the valves are connected by conduits with which the valves are placed into communication with each other, a source of carrier gas, a sample of gas, the chromatographic column, and a restricted vent to atmosphere.

FIG. 1 further illustrates the valves A, B and C, and conduits 10, 11, 12 and 13 mounted within a heated space, or oven 1. The sample system is now disclosed as a closed volume, comprising the passages of valves A–C together with conduits 10–13, and this system is heated by the oven as necessary to vaporize liquid samples injected into the circuit. After proper preparation in the heated volume of the closed circuit, the sample, or a portion of the sample, is taken directly into the column for analysis.

Sample injection

Fig. 1 discloses how liquid material to be analyzed can be inserted into this closed and heated sample loop and vaporized for entry into the partition column. A syringe 14 of the liquid is inserted through a septum 15 in the wall of conduit 12 and the liquid forced directly into the conduit 12. The oven heat is then regulated to vaporize the liquid and cause it to distribute uniformily through the sample loop.

Whole sample injection in the column

Figure 2:
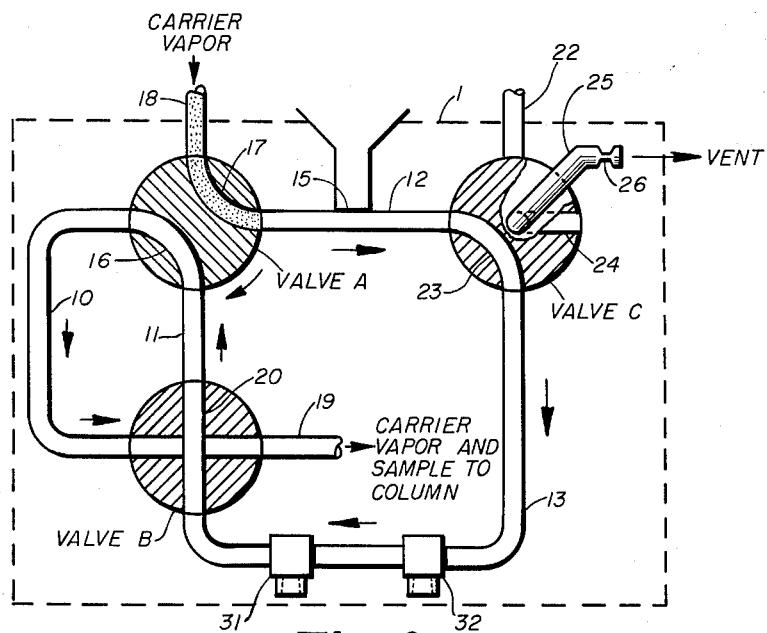
FIG. 2 is the structure of FIG. 1 with the valves positioned to flush the whole sample into the column.

FIG. 2 shows the system of FIG. 1 with valve A rotated 90 degrees clockwise from its FIG. 1 position. In FIG. 1, passage 16 connects conduits 11 and 12.

In FIG. 2, passage 16 is positioned to connect conduits 10 and 11.

Valve conduit 17 is positioned to connect the carrier gas supplied conduit 18 to the conduit 12. Therefore, by turning valve A 90 degrees from its FIG. 1 position a simple, continuous passage is formed with conduits 18, 17, 12, 13, 11, 16, 10 and outlet conduit 19. With carrier vapor supplied conduit 18, the whole vaporized sample is pushed-flushed from the heretofore closed volume of the conduits and valves and into the partition column connected to conduit 19.

The length of the conduits 11, 12 13 can be established as desired. The result is to form a gaseous sample of predetermined size and temperature for injection into the column. This arrangement prevents the sample size from being determined by the variable rate of manual injection with syringe 14. The sample is thereby sized with precision and passed into the column by the simple operation of valve A. The result is to provide an indication of the sample components as they are discharged from the partition column which is readily interpreted. This result is made possible by providing a volumetrically and temperature stable sample for the column.

Split sample injection

Figure 3:
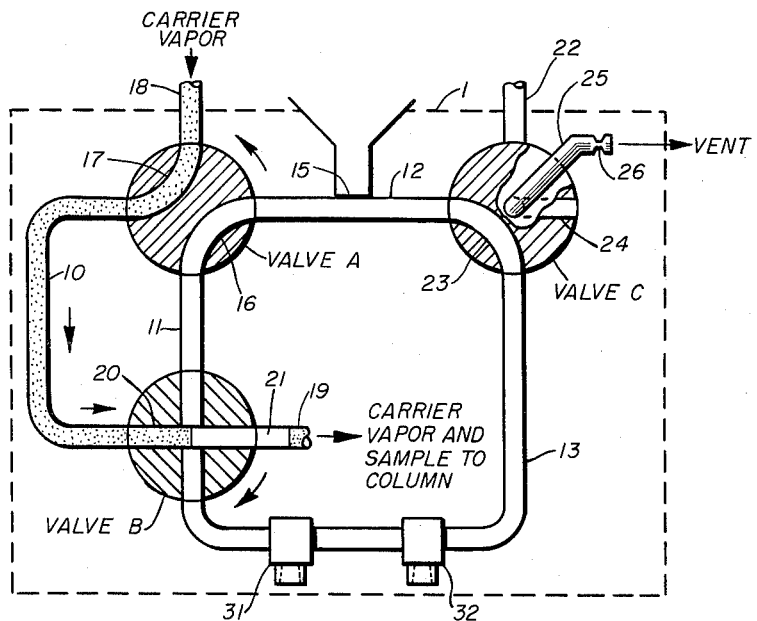
FIG. 3 is the structure of FIG. 1 with the valves positioned to flush a part of the whole sample into the column.

FIG. 3 shows the FIG. 1 system with only valve B rotated 90 degrees clockwise from its FIG. 1 position. In FIG. 1 passage 20 connects conduits 11 and 13. The volumetric capacity of valve passage 20 has a predetermined ratio to the volumetric capacity of the remainder of the closed portion of the system. The length of the conduits 11, 12 or 13 set the ratio as desired. Passage 20, of valve B, is employed to carve out of the closed loop a sample slug small enough to give the accuracy desired in the analysis.

The actual volume of the sample going into the column is fixed when valve B is rotated from the FIG. 1 position to the position shown in FIG. 3. Valve passage 20 is shifted from being a part of the closed sample loop when connecting conduits 11 and 13 to being a part of a passage connecting the source of carrier vapor to the column. The slug of sample, carved from the total sample in the closed loop, is indicated at 21 in the passage as it moves into conduit 19, heading for the column.

Flushing the closed loop

Figure 4:
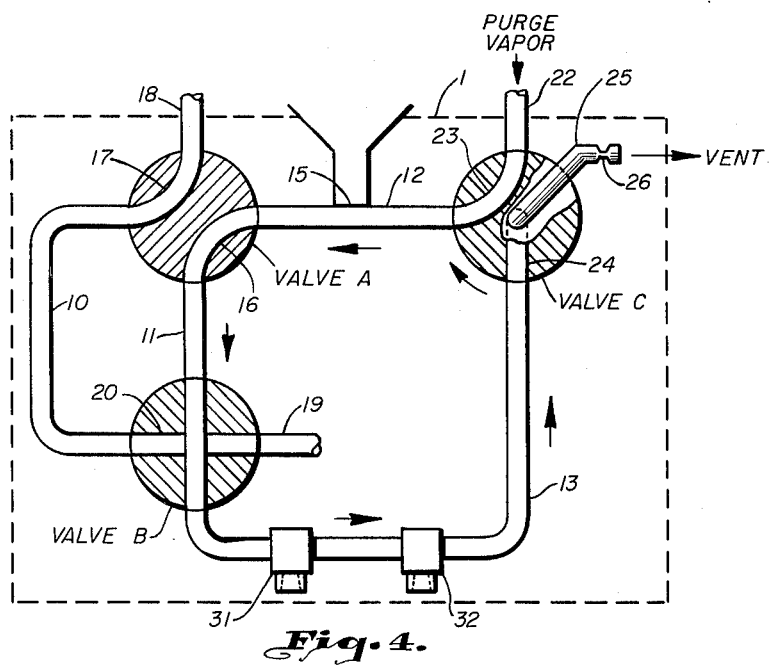
FIG. 4 is the structure of FIG. 1 with the valves positioned to purge the structure of sample.

FIG. 4 shows how valve C can be employed to remove the sample portion of FIG. 3 from the closed loop which was not pushed into the column. Purge vapor, which can be the source of carrier vapor, is connected to conduit 22, and valve C passage 23 is positioned to connect conduit 22 to conduit 12. At the same time, valve C passage 24 is positioned to connect conduit 13 to vent conduit 25. A restriction 26 prevents undue waste of purge vapor to the atmosphere.

It is also evident that if a vaporized sample is already available it can be injected into the closed loop by connecting its container-source to conduit 22. The loop, filled with the vaporized sample can then be closed by returning valve C to its FIG. 1 position. The sample is then pushed into the volume in its entirety, or in part.

External loop

Figure 5:
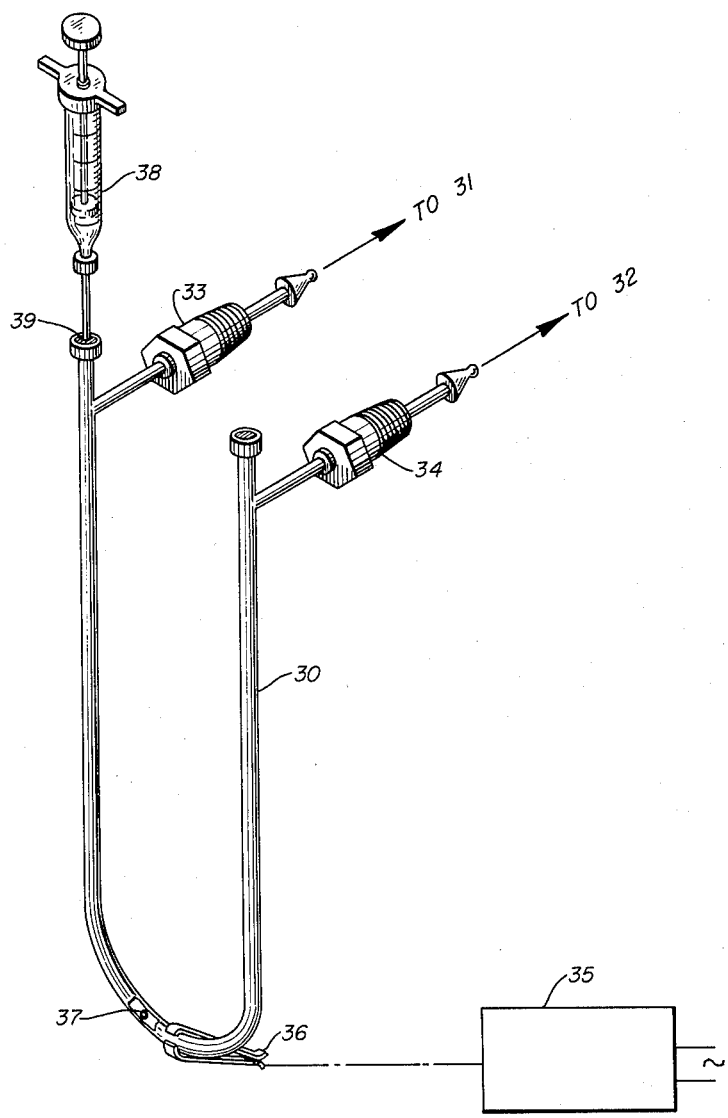
FIG. 5 is an isometric view of the external sample loop as connected to the structure of FIG. 1.

FIG. 5 illustrates a loop of conduit 30 which can be spliced into the heated closed loop of FIG. 1. Fixtures 31 and 32 are placed in conduit 13 to provide a means for connecting the external loop 30 into the closed system.

Connectors 33 and 34, mounted on the ends of loop 30, are arranged to readily connect and disconnect to fixtures 31 and 32. When connectors 33, 34 are inserted into fixtures 31, 32 external loop 30 is connected in series with valves A, B and C and their connecting conduits. Conduit section 13A is not used when connectors 33, 34 are removed from fixtures 31, 32 conduit 13 again includes conduit section 13A and becomes a simple passage valves B and C.

External loop 30 offers a convenient receptacle from which to distill gas from samples and pass this gas into the closed loop for subsequent insertion into the column. Even material containing solids can be placed within loop 30 and heat applied as needed to drive off distillables.

Specifically, a source 35 of low voltage and high current is indicated as connected to loop 30 by electrical connection 36. The loop 30 is heated as required to drive off the gaseous material to be analyzed. Once in the closed loop, the gaseous material is passed into the column as is any sample.

A crude oil sample is indicated at 37 within loop 30. Actually, material which can be handled by a syringe 38 can be placed in loop 30 through a septum 39. In either event, the material left behind, isolated from the closed loop of FIG. 1 and the column, can then be cleaned from loop 30 much more readily than the conduits and valves of FIG. 1.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. An inlet system for a partition chromatograph, including,
    a first valve having a first and second passages,
    a second valve having a first and second passages,
    a closed loop of conduit including a passage of each valve as determined by the position of each valve,
    means of heating the valves and loop,
    a source of carrier vapor connected to the passage of the first valve determined by the position of the first valve,
    a conduit connecting the passages of each valve as determined by the position of each valve,
    means for injecting a sample of vaporizable material to be analyzed into the closed loop,
    and a partition column connected to the passages of the second valve as determined by the position of the second valve, the first valve selectively connecting the source of carrier vapor to the partition column with one of the passages of the first valve, the conduit between the valves and one of the passages of the second valve and with the other of the passages of the first valve, the closed loop of conduit, the conduit between the valves and both passages of the first valve.

2. An inlet system for a partition chromatograph, including,
    a first valve having a first and second passages,
    a second valve having a first and second passages,
    a third valve having a first and second passages,
    a first conduit connecting the passages of the first valve to the second valve as determined by the position of each valve,
    a second conduit connecting the passages of the second valve to the third valve as determined by the position of each valve,
    a third conduit connecting the passages of the third valve to the first valve as determined by the position of each valve,
    means for heating the valves and conduits which comprise a closed loop,
    means for injecting a sample of vaporizable material to be analyzed in the closed loop,
    a source of carrier vapor selectively connected to the passages of the first valve as determined by the two positions of the first valve,
    a source of purge vapor connected to one of the passages of the third valve, and a partition column selectively connected to the passages of the second valve as determined by the two positions of the second valve, whereby the carrier vapor may be connected to push all sample from the closed loop into the partition column, a portion of the sample from the closed loop, and the purge vapor may be connected to flush all of the sample from the closed loop.

3. An inlet system for a partition chromatograph, including,
   a valve having first and second passages,
   a closed loop of conduit including the valve passages alternately as determined by the position of the valve,
   means of heating the valve and loop,
   a source of carrier vapor connected to the valve passage which is not included in the closed loop of conduit,
   an outside loop of conduit detachably connected to the closed and heated loop of conduit and adapted to receive material containing non-distillable substances,
   means for heating the outside loop independently of the means for heating the closed loop,
   and a partition column connected to the valve passage which is not included in the closed loop of conduit to receive the volume of vaporized sample in the valve passage and removed from the closed loop when the valve is positioned.

4. An inlet system for a partition chromatograph which comprises,
   a closed loop,
   a source of carrier vapor,
   a conduit connecting the carrier vapor source to a partition column of the chromatograph,
   a valve with two passages and positionable to two positions which alternately include each of the two passages as a finite portion of the closed loop and conduit simultaneously,
   means of heating the valve and loop,
   an outside loop of conduit detachably connected to the closed and seated loop of conduit and adapted to receive material containing non-distillable substances,
   and means for heating the outside loop independently of the means for heating the closed loop.

References Cited by the Examiner
UNITED STATES PATENTS

| | | | |
|---|---|---|---|
| 2,982,123 | 5/1961 | Kindred | 73—23.1 |
| 3,000,218 | 9/1961 | Marks, et al. | 73—422 |
| 3,071,005 | 1/1963 | Skidmore | 73—422 |
| 3,160,015 | 12/1964 | Charlton et al. | 73—422 |

OTHER REFERENCES

Article by Dimbat et al. in Analytical Chemistry, vol. 28, No. 3, March 1956, pages 290–306.

RICHARD C. QUEISSER, *Primary Examiner.*